(12) United States Patent
Stavi

(10) Patent No.: US 10,893,308 B2
(45) Date of Patent: Jan. 12, 2021

(54) HYBRID STATISTICAL MULTIPLEXER

(71) Applicant: Harmonic, Inc., San Jose, CA (US)

(72) Inventor: Yoed Stavi, Zikhron Ya'akov (IL)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 16/206,908

(22) Filed: Nov. 30, 2018

(65) Prior Publication Data

US 2019/0364310 A1    Nov. 28, 2019

Related U.S. Application Data

(60) Provisional application No. 62/593,825, filed on Dec. 1, 2017.

(51) Int. Cl.
H04N 21/2365 (2011.01)
H04N 21/434 (2011.01)

(52) U.S. Cl.
CPC ... H04N 21/23655 (2013.01); H04N 21/4347 (2013.01)

(58) Field of Classification Search
None
See application file for complete search history.

(56) References Cited

U.S. PATENT DOCUMENTS

| | | | | |
|---|---|---|---|---|
| 5,828,414 A * | 10/1998 | Perkins | ............... | H04N 21/4344 375/240.01 |
| 6,738,983 B1 * | 5/2004 | Rao | ............. | H04H 60/94 348/E5.002 |
| 7,016,337 B1 | 3/2006 | Wu et al. | | |
| 7,173,947 B1 | 2/2007 | Ramakrishnan | | |
| 7,486,680 B1 * | 2/2009 | Zhang | ............... | H04N 21/23406 370/395.4 |
| 8,015,584 B2 * | 9/2011 | Breen | ................ | H04N 7/17318 725/86 |
| 8,218,651 B1 * | 7/2012 | Eshet | ............... | H04N 21/23424 348/515 |
| 8,300,541 B2 * | 10/2012 | Cholas | ............... | H04L 12/2801 370/252 |
| 8,625,607 B2 * | 1/2014 | Rieger | .................... | H04H 20/42 370/395.64 |
| 9,723,267 B2 * | 8/2017 | Carlucci | ............ | H04N 7/17318 |
| 10,051,238 B2 * | 8/2018 | Yang | .................. | H04N 21/2343 |

(Continued)

OTHER PUBLICATIONS

Search Report IP.Com.*

*Primary Examiner* — Mohammad J Rahman
(74) *Attorney, Agent, or Firm* — Brokaw Patent Law PC; Christopher J. Brokaw

(57) ABSTRACT

Delivering a transport stream using a hybrid statistical multiplexer. Over a plurality of multiplexing cycles, a plurality of single program transport streams (SPTSs) are multiplexed onto a multiple program transport stream (MPTS). In each multiplexing cycle, it is determined whether any portion of the packets carried by the plurality of SPTSs may be delayed such that the delayed portion is multiplexed onto the MPTS in a future multiplexing cycle. For each multiplexing cycle, delay information that identifies how many packets were delayed is determined. The size of the bit rate pool for a subsequent allocation cycle is adjusted based on the delay information for a prior multiplexing cycle. Thereafter, the MPTS is delivered to one or more recipients.

20 Claims, 8 Drawing Sheets

(56) References Cited

U.S. PATENT DOCUMENTS

| | | | |
|---|---|---|---|
| 2005/0036519 A1* | 2/2005 | Balakrishnan | H04N 21/23608 370/503 |
| 2005/0039064 A1* | 2/2005 | Balakrishnan | H04N 21/23608 713/400 |
| 2006/0130113 A1* | 6/2006 | Carlucci | H04N 7/17318 725/118 |
| 2006/0182139 A1* | 8/2006 | Bugajski | H04L 65/4084 370/464 |
| 2007/0055983 A1* | 3/2007 | Schiller | H04N 21/23424 725/32 |
| 2009/0028192 A1* | 1/2009 | Rieger | H04H 20/42 370/535 |
| 2009/0207866 A1* | 8/2009 | Cholas | H04L 12/2801 370/505 |
| 2011/0138414 A1* | 6/2011 | Koren | H04N 21/23424 725/35 |
| 2012/0060182 A1* | 3/2012 | Hardin | H04N 21/23895 725/31 |
| 2012/0177066 A1* | 7/2012 | Spransy | H04N 21/64784 370/486 |
| 2013/0033642 A1* | 2/2013 | Wan | H04N 19/39 348/495 |
| 2013/0128956 A1* | 5/2013 | Bouillet | H04N 19/89 375/240.02 |
| 2014/0139733 A1 | 5/2014 | MacInnis et al. | |
| 2014/0301481 A1* | 10/2014 | Novotny | H04N 21/2401 375/240.26 |
| 2016/0182943 A1* | 6/2016 | Stahl | H04N 21/23608 370/412 |
| 2017/0085616 A1* | 3/2017 | Botsford | H04L 67/02 |
| 2018/0063217 A1* | 3/2018 | Barkley | H04N 21/8547 |

* cited by examiner

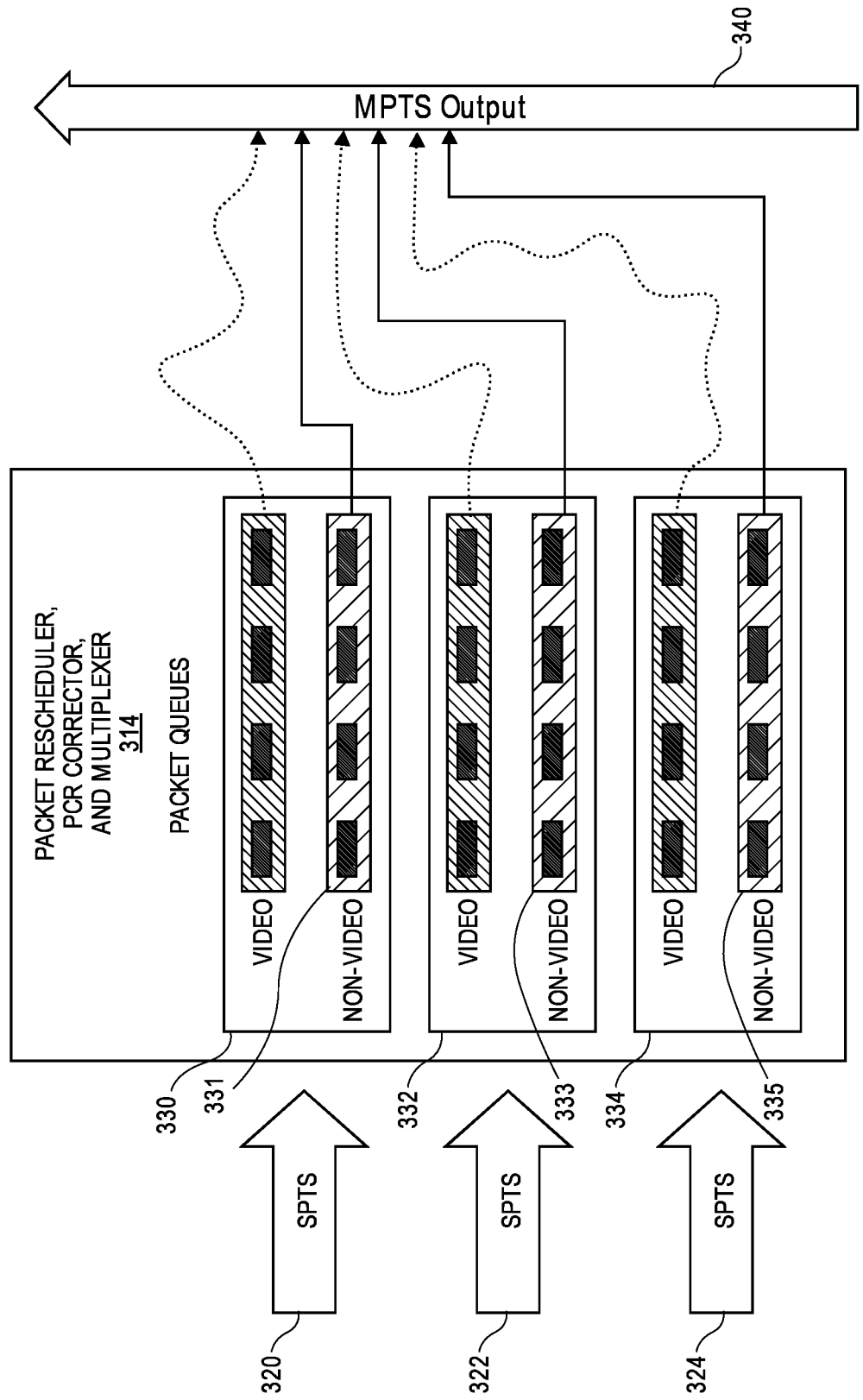

HYBRID STATISTICAL MULTIPLEXER

CLAIM OF PRIORITY

This application claims priority to U.S. Provisional Patent Application Ser. No. 62/593,825, filed Dec. 1, 2017, entitled "Hybrid StatMux," the contents of which are hereby incorporated by reference for all purposes as if fully set forth herein.

FIELD OF THE INVENTION

Embodiments of the invention generally relate to statistical multiplexing of digital video, that is to say, generally relate to combining a plurality of single program transport streams (SPTSs) into a single multiple program transport stream (MPTS).

BACKGROUND

In traditional statistical multiplexing, a single communication channel is divided into an arbitrary number of variable bit rate digital channels. The number of bits allocated to each of the digital channels is dynamically adjusted by an encoder many times a second based on the complexity of the digital video carried by each channel. The complexity of digital video is a measure of how much data (or 'bits') is required to describe how to display the digital video. When a particular channel requires an increase in the number bits to which it is allocated to sufficiently describe the complexity of digital video carried thereby for a given time interval, additional bits can be allocated to that channel for that time interval from another channel which does not need all of its assigned bits for that given time interval.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 3B is an illustration of the multiplexing component of a hybrid statistical multiplexer in accordance with an embodiment of the invention;

DETAILED DESCRIPTION OF THE INVENTION

Approaches are described herein for a hybrid statistical multiplexer according to an embodiment of the invention. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments of the invention are directed towards an enhanced statistical multiplexer, referred to herein as a hybrid statistical multiplexer ("hybrid stat mux"), which operates differently than any prior art statistical multiplexer. In each multiplexing cycle, as with prior art multiplexers, a hybrid stat mux may multiplex packets from a plurality of single program transport streams onto a single multiple program transport stream. According to an embodiment, and in contrast to the prior art, the hybrid stat mux may delay some video packets in a particular multiplexing cycle (i.e., a cycle in which temporarily stored packets are multiplexed onto a multiple program transport stream) to make room for certain non-video packets in that multiplexing cycle. Further, the size of the bit rate pool used by the hybrid stat mux in subsequent (i.e., near future) allocation cycles (i.e., a cycle in which some amount of bit rate is allocated to each of a plurality of encoders) is adjusted based on how video packets were delayed in prior multiplexing cycles.

To facilitate delaying, when possible, certain packets are multiplexed onto the multiple program transport stream, certain embodiments may temporarily store packets in an in-memory container, such as but not limited to a queue. Each incoming stream to the hybrid stat mux may have its packets stored in two or more in-memory containers. The particular in-memory container in which a packet is stored may be based upon not only the stream which carried the packet, but also how much the packet may be delayed. For example, certain types of packets which are capable of being delayed may be stored in their own in-memory container to facilitate different treatment over those packets which are deemed to be less capable of being delayed. These and other features of embodiments will be described in greater detail below.

Prior Art Statistical Multiplexing

Figure 1:
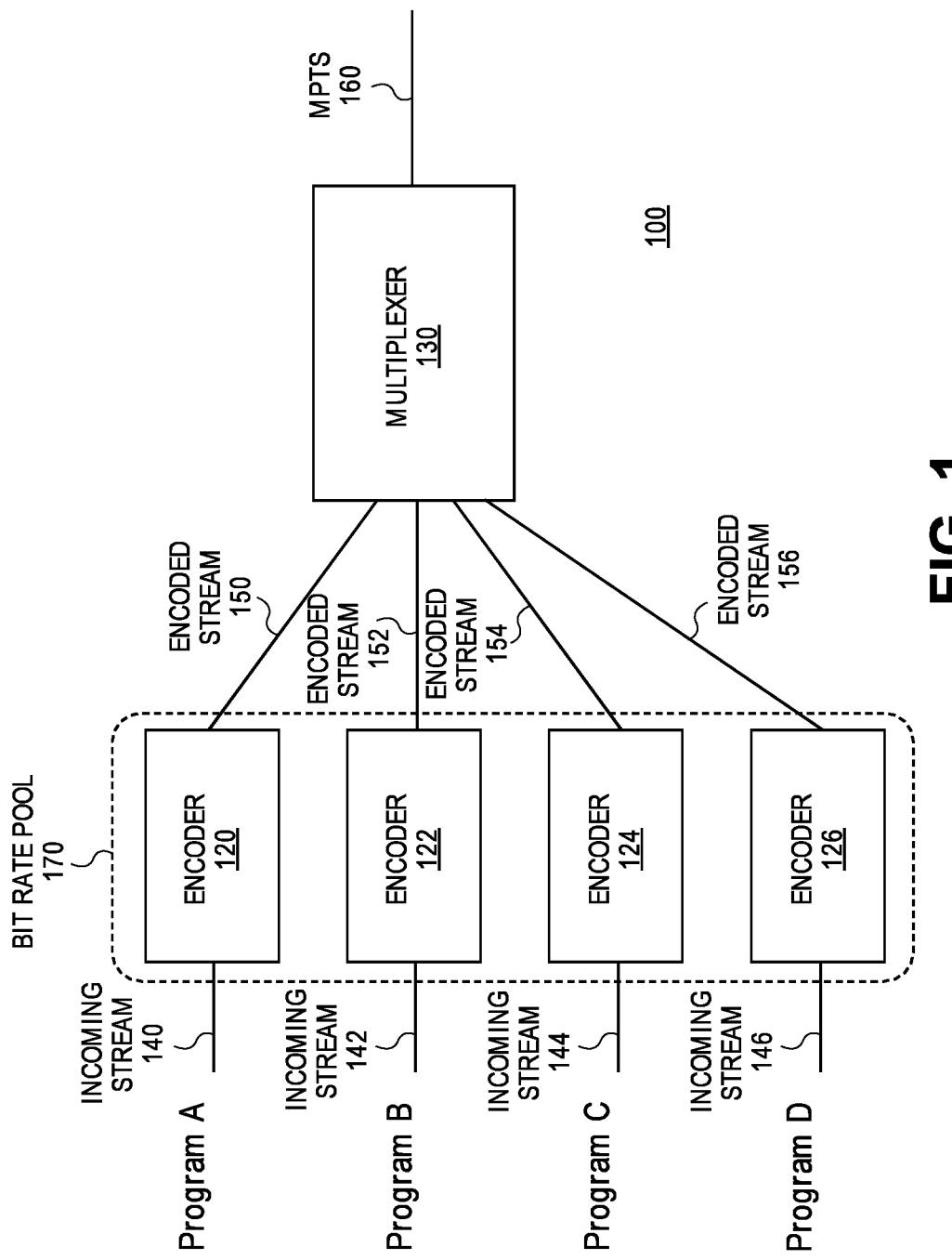
FIG. 1 is a block diagram of the functional components of system according to the current state of the art.

Before describing how embodiments of the invention operate in detail, it will be helpful to appreciate the operation of certain prior art approaches. FIG. 1 is a block diagram of the functional components of system 100 according to the current state of the art. System 100 includes encoders 120, 122, 124, and 126, multiplexer 130, and bit rate pool 170. Encoders 120, 122, 124, and 126 individually refer to hardware or software components responsible for converting an incoming digital video stream (expressed in a first digital video format) to an encoded digital video stream (expressed in a second and different digital video format).

For example, encoders 120, 122, 124, and 126 may respectively convert incoming digital video streams 140, 142, 144, and 146 from a first digital video format to encoded streams 150, 152, 154, and 156, each of which is expressed in digital video format different from which incoming streams 140, 142, 144, and 146 are expressed. It may be advantageous or necessary to change the format in which a digital video file is expressed for a variety of reasons, such as to achieve, gain, or promote standardization, speed, secrecy, security, and/or compression.

Each of incoming digital video streams 140, 142, 144, and 146 may comprise one or more units of digital video, e.g., a program. For purposes of providing a clear explanation, it shall be assumed in the description below that digital video streams 140, 142, 144, and 146 each carry a single program at a time.

Multiplexer 130 refers to a hardware or software component for combining multiple encoded streams, such as encoded streams 150, 152, 154, and 156 into a single multiple program transport stream, such as multiple program transport stream (MPTS) 160. Digital streams 150, 152, 154, and 156 each become embedded in MPTS 160 as is, i.e., without any manipulation to the video or audio content and bit rate. Digital streams 150, 152, 154, and 156, as broadly used herein, represent encoded digital streams produced by approaches where the encoder and the multiplexer are communicating over a network as well as other approaches where the encoder and multiplexer share hardware and may communicate directly with one another.

A bit rate pool refers to a total amount of bit rates that are available for encoding one or more programs organized in a group. For example, as depicted in FIG. 1, bit rate pool 170 refers to the total amount of bit rates available for encoding incoming streams 140, 142, 144, and 146 for a particular allocation cycle of multiplexer 130. In this way, multiplexer 130 instructs encoders 120, 122, 124, and 126 to encode incoming streams 140, 142, 144, and 146 in a way such that the sum of their encoded bit rate is equal to or no greater than the size of bit rate pool 170 for a particular allocation cycle of multiplexer 130.

In many systems, in addition to video data, MPTS 160 also carries other types of variable bit rate traffic, such as sub-titles, VBR audio, and the like. Thus, MPTS 160 may need to accommodate other types of variable bit rate traffic in addition to video data. In the prior art, multiplexer 130 must be informed in advance of how much of the available bit rate for a given allocation cycle is guaranteed to be available for the video data traffic. In certain prior art implementations, encoders 120-126 may be able to measure the bit rate that is required for non-video data traffic flowing therethrough and may adjust their video bit rate accordingly. However, in the prior art, there is no way to measure the bit rate that is required for non-video data traffic that does not flow through an encoder, but instead, arrives directly at multiplexer 130.

Advantageously, embodiments of the invention overcome limitations of the prior art and are able to multiplex any sets of incoming streams, regarding whether each individual incoming streams is a constant bit rate (CBR) stream or a variable bit rate (VBR) stream, and ensure that the total bit rate does not exceed a specification while not reserving any bit rate for traffic that does not exist at the moment. Further, embodiments do so without increasing the delay of any packets more than what is permitted by the transport stream's compliance rules (i.e., a positive difference is maintained between DTS/PTS and PCR).

Hybrid Statistical Multiplexer

Figure 2:
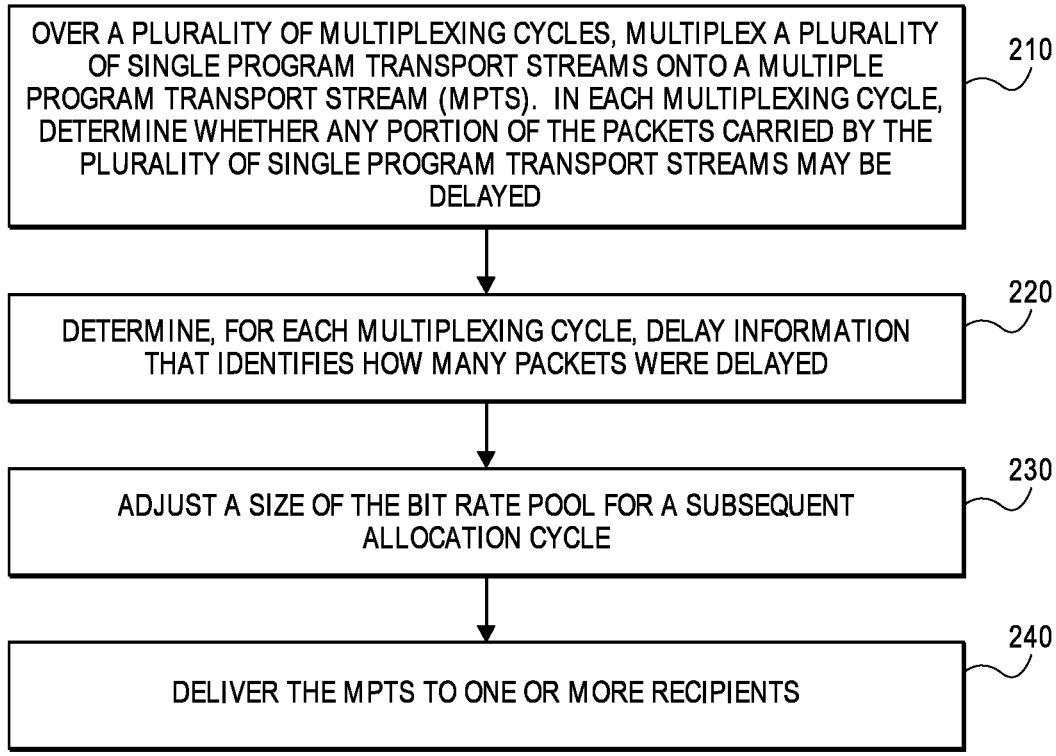
FIG. 2 is a flowchart illustrating an approach for using a hybrid statistical multiplexer according to an embodiment of the invention.

FIG. 2 is a flowchart illustrating an approach of an embodiment for using a special type of statistical multiplexer termed herein as a hybrid statistical multiplexer ("hybrid stat mux"). The steps of FIG. 2 will be described below with reference to certain drawings, such as FIGS. 3A and 3B, both of which will be described below before turning to the explanation of the steps of FIG. 2

Figure 3A:
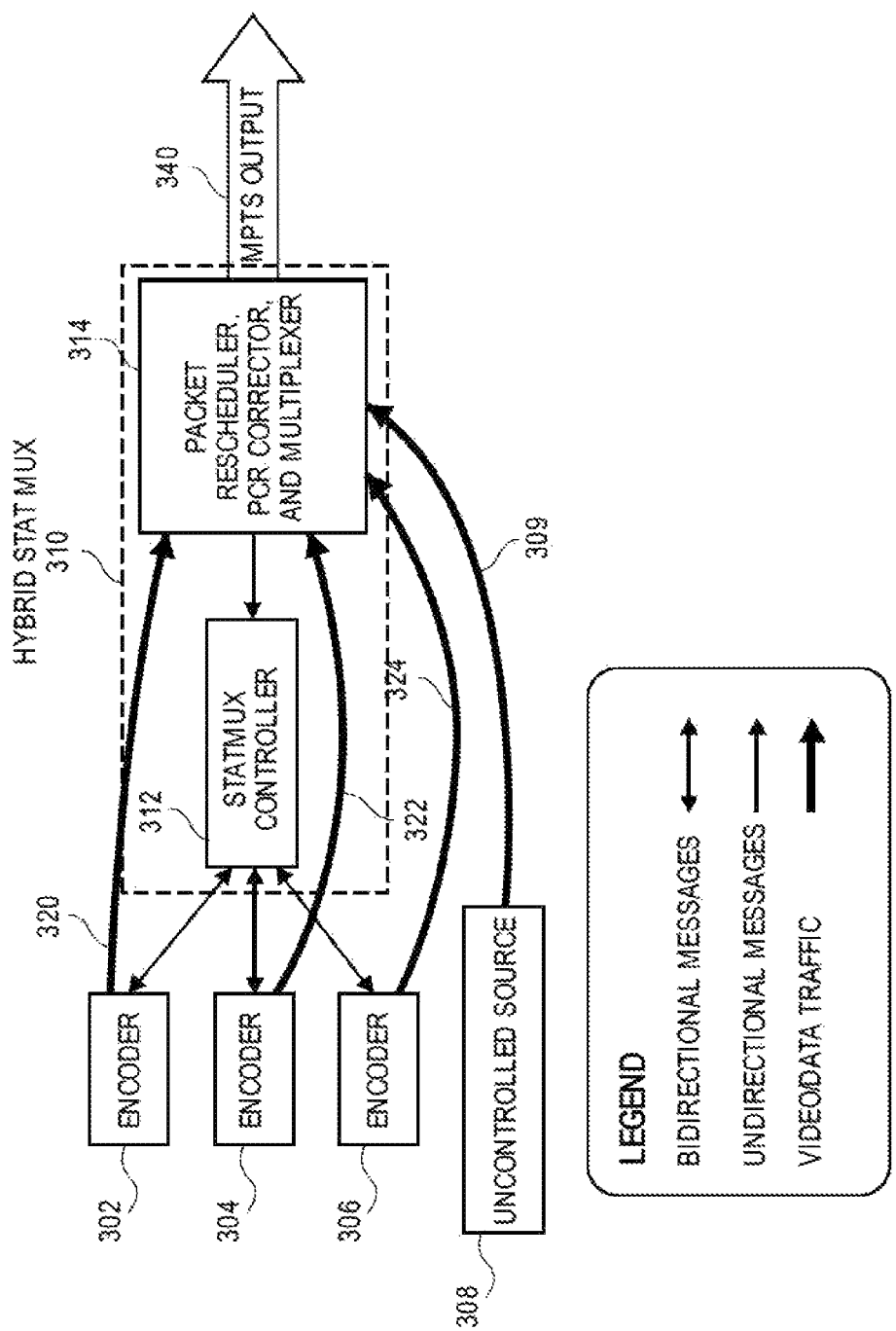
FIG. 3A is an illustration of a hybrid statistical multiplexer in accordance with an embodiment of the invention.

FIG. 3A is an illustration of a hybrid stat mux 310 in accordance with an embodiment of the invention. As shown in FIG. 3A, hybrid stat mux 310 comprises statmux controller 312 and packet rescheduler, PCR corrector, and multiplexer 314 (or "multiplexer" 314). Statmux controller 312 is responsible for communicating with encoders 302, 304, and 306 to instruct each encoder on how much content (how big a portion of a single program transport stream being encoded by that encoder) to send to the multiplexer 314 in a particular allocation cycle that will occur in the near future. The term allocation cycle shall be used herein to distinguish over a multiplexing cycle, which is an cycle used by multiplexer 314 to build multiple program transport stream (MPTS) 340 by multiplexing packets onto the MPTS 340. In each multiplexing cycle, the amount of packets that may be selected for multiplexing onto MPTS 340 may not be larger than the bit rate constraint of the MPTS 340. A bit rate distribution algorithm may be used to determine how many packets should be selected from each SPTS 320, 322, and 324 as well as the uncontrolled traffic 309. Allocation cycles and multiplexing cycles need not be synchronized and need not be the same duration.

FIG. 3A depicts three encoders 302, 304, and 306 as well as uncontrolled source 308. Uncontrolled source 308, as used herein, is intended to broadly represent any source of content which is received by multiplexer 314 without prior coordination with statmux controller 312. Thus, while encoders 302, 304, 306 each communicate with statmux controller 312 prior to sending video/data traffic 320, 322, and 324 respectively to multiplexer 314, uncontrolled source 308 does not communicate with statmux controller 312 at all prior sending video/data traffic 309 to multiplexer 314. Advantageously, hybrid stat mux 310 is able to multiplex any sets of incoming streams, including video/data traffic 320, 322, and 324, and/or 309, and ensure that the total bit rate used for each multiplexing cycle does not exceed a specification while not reserving any bit rate in that multiplexing cycle for traffic that does not exist at the moment.

FIG. 3B is an illustration of multiplexer 314, shown in FIG. 3A, in more detail in accordance with an embodiment of the invention. Multiplexer 314 is shown in FIG. 3B as receiving as input a plurality of single program transport stream (SPTS). For example, FIG. 3B depicts SPTS 320, 322, and 324 being input to multiplexer 314. Each of SPTS 320, 322, and 324 may carry a stream of encoded digital video. Each of SPTS 320, 322, and 324 may be produced by its own encoder, such as encoders 302, 304, and 306 shown in FIG. 3A. While FIGS. 3A and 3B depict three SPTSs being input to hybrid stat mux 310, hybrid stat mux 310 may receive as input any number of SPTSs.

Multiplexer 314 multiplexes packets carried by each of SPTSs 320, 322, and 324 onto multiple program transport stream (MPTS) 340. As is well understood by those in the art, a multiplexer, such as multiplexer, multiplexes packets carried by SPTSs onto a MPTS in a series of multiplexing cycles.

Multiplexer 314 is a statistical multiplexer which maintains a plurality of in-memory containers for temporarily storing packets. These in-memory containers may be implemented by any medium or mechanism that allows for temporarily storing a packet in memory. FIG. 3B depicts the in-memory containers of multiplexer 314 as a queue, but other structures or mechanisms for temporarily storing packets in memory may be employed by other embodiments.

When multiplexer 314 stores a received packet within an in-memory container, the received packet's original transmission time is stored in association with the packet in the in-memory container so that multiplexer 314 may evaluate the delay of a packet as well as be able to preserve the original transmission schedule when necessary.

Multiplexer 314 may associate one or more in-memory containers with each single program transport stream (SPTS) input to hybrid stat mux 310 for purposes of temporarily storing packets in the in-memory container from an associated SPTS. For a particular SPTS, multiplexer 314 may select a particular in-memory container, from a set of two or more in-memory containers associated with that SPTS, in which to temporarily store a particular packet carried by that SPTS based on whether that packet possesses a certain characteristic or attribute. For example, for any given SPTS that is input to hybrid stat mux 310, multiplexer 314 may store video data packets carried by that SPTS in a first in-memory container designated to temporarily store video data packets and may store non-video data packets carried by that same SPTS in a second in-memory container designated to temporarily store non-video data packets.

To illustrate, FIG. 3B depicts an in-memory container as a packet queue. Multiplexer 314 stores video packets from SPTS 320 in video packet queue 330 and non-video packets from SPTS 320 in non-video packet queue 331. Multiplexer 314 also stores video packets from SPTS 322 in video packet queue 332 and non-video packets from SPTS 324 in non-video packet queue 333; similarly, multiplexer 314 stores video packets from SPTS 322 in video packet queue 334 and non-video packets from SPTS 324 in non-video packet queue 335.

When a packet from any SPTS is received by multiplexer 314, the received packet is temporarily stored in the appropriate in-memory container. For example, when a video packet is received via SPTS 320, multiplexer 314 may store that video packet in video packet queue 330, and when a non-video packet is received via SPTS 320, multiplexer 314 may store that non-video packet in non-video packet queue 331.

It should be noted that while embodiments of the invention shall chiefly be described in terms of in-memory containers maintained by multiplexer 314 which store video packets and non-video packets, other embodiments may maintain in-memory containers that distinguish what types of packets should be stored therein based upon how capable a type of packet is of being delayed without becoming non-compliant vis-à-vis a video codec associated therewith. For example, multiplexer 314 may maintain two types of in-memory containers, one type is for storing packets (such as non-video data packets) which are more likely of becoming non-compliant vis-à-vis a video codec associated therewith, while a second type is for storing packets (such as video data packets) which are less likely of becoming non-compliant vis-à-vis a video codec associated therewith.

To understand how packets stored in in-memory containers maintained by multiplexer 314 are selected for inclusion within a particular multiplexing cycle, it may be helpful to return to FIG. 2 and describe the steps thereof. In step 210 of FIG. 2, for each multiplexing cycle of multiplexer 314, multiplexer 314 determines whether any portion of the received packets carried by the plurality of SPTS may be delayed with respect to their originally assigned schedule. To do so, multiplexer 314 may initially consult a set of in-memory containers storing packets which are deemed to be less capable of being delayed without becoming non-compliant vis-à-vis a video codec associated therewith than packets stored by another set of in-memory containers. In an embodiment, non-video data packets are more likely of becoming non-compliant vis-à-vis a video codec the longer they are delayed. For this reason, in an embodiment, multiplexer 314 may deem that non-video data packets stored in in-memory containers are more likely of becoming non-compliant vis-à-vis a video codec the longer they are delayed.

When selecting data packets for inclusion within a given multiplexing cycle, multiplexer 314 of an embodiment will give preference to non-video packets by first selecting for inclusion within a particular multiplexing cycle those non-video packets stored in any of the in-memory containers designated to store non-video packet maintained by multiplexer 314. In doing so, multiplexer 314 will select for inclusion certain non-video packets that are stored in in-memory containers to enable those selected packets to be multiplexed onto MPTS 340 based on the schedule that existed when the selected non-video packets were originally stored in the non-video in-memory containers. This schedule associated with the selected non-video packets may be assigned to the non-video packet during the creation of the stream, e.g., the schedule may have been assigned by an encoder.

Thus, the rate at which non-video packets are selected for inclusion in a particular multiplexing cycle from an in-memory container maintained by multiplexer 314 is based on the existing schedule assigned to the non-video packet during its creation. Multiplexer 314 does not modify this assigned schedule for non-video packets. As shall be explained below, this treatment of non-video packets by multiplexer 314 differs from how multiplexer 314 handles the processing of video packets. In brief, video packets may be multiplexed onto MPTS 340 earlier or later than their original schedule, so long as multiplexer 314 never exceeds the specified bit rate of MPTS 340 and packets carried by MPTS 340 remain compliant in their encoded codec.

For each multiplexing cycle, after multiplexer 314 selects data packets deemed to be less capable of being delayed without becoming non-compliant vis-à-vis a video codec associated therewith (such as non-video data packets, for example) for inclusion in a particular multiplexing cycle, multiplexer 314 selects data packets from in-memory storing data packets deemed to be more capable of being delayed without becoming non-compliant vis-à-vis a video codec associated therewith (such as video data packets, for example) until the remaining bit rate in that particular multiplexing cycle is used. Thus, packets are selecting for inclusion in a particular multiplexing cycle from in-memory containers designated for storing video data packets at a rate that is based, at least in part, upon how much bit rate remains in the particular multiplexing cycle after non-video data packets have been reviewed for inclusion in that multiplexing cycle. The rate at which packets are removed from in-memory containers designated for storing video data packets is also based upon an amount of pending traffic in each program carried by the SPTSs input to hybrid stat mux 310.

Figure 4:
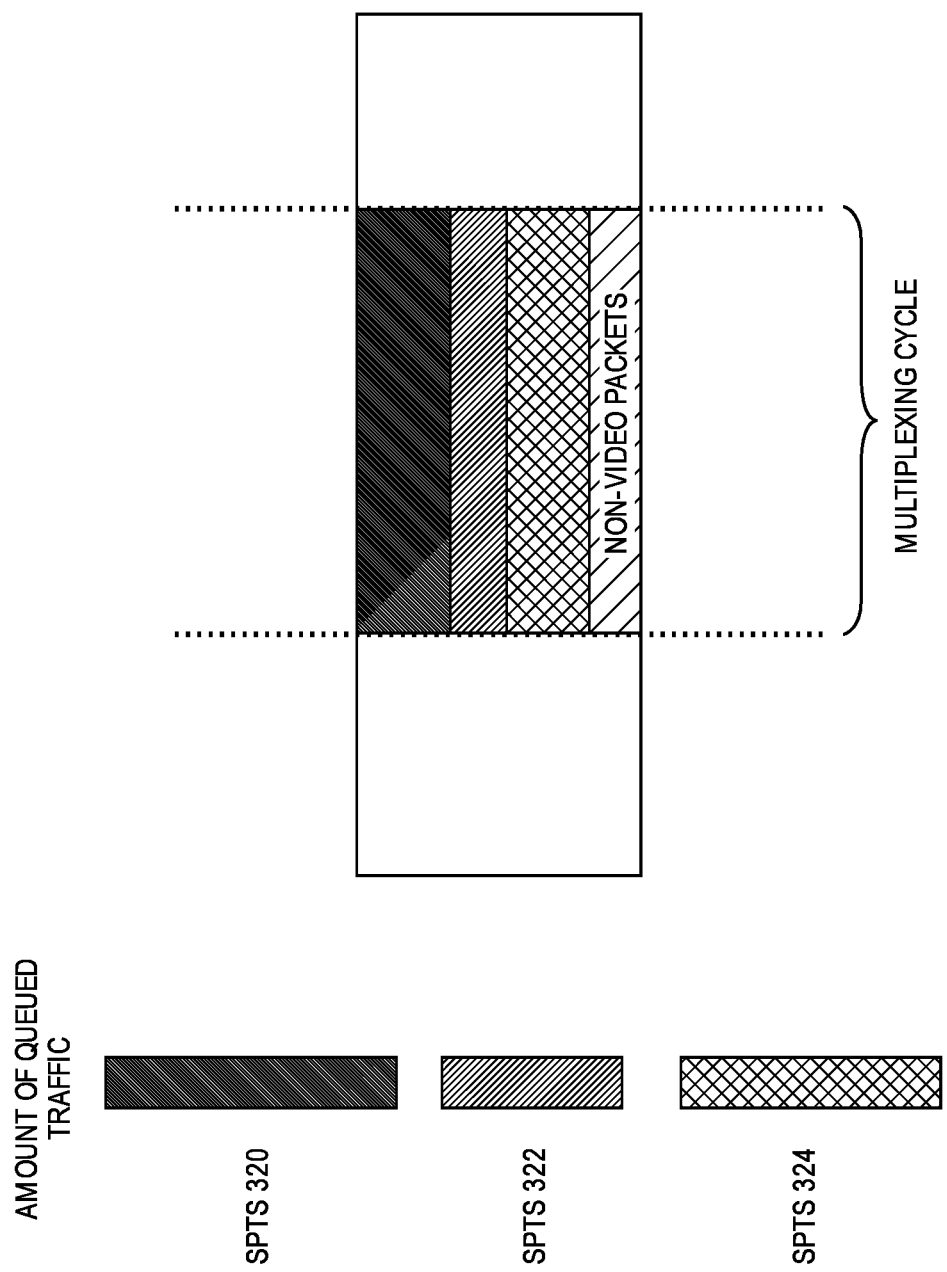
FIG. 4 is an illustration of the multiplexing cycle of a hybrid stat mux according to an embodiment of the invention.

FIG. 4 is an illustration of the multiplexing cycle according to an embodiment of the invention. As shown in FIG. 4, the amount of packets that are selected for multiplexing from each queue in each multiplexing cycle is usually in proportion to the amount of packets that are pending in the respective queue (unless delay and/or VBV considerations affect the outcome).

In an embodiment, to ensure that each program remains valid, multiplexer 314 may make necessary adjustments in which packets are selected for inclusion in a multiplexing cycle. If one of the streams input to multiplexer 314 is in danger of having a non-compliant VBV level, then the bit rate distribution of the multiplexer 314 will prefer this stream to select more packets from in-memory containers associated with that stream. In this way, a stream that is in danger of having a non-compliant VBV level will receive an increased share of the bit rate distribution of a multiplexing cycle.

Advantageously, multiplexer 314 selects packets from in-memory containers it maintains and multiplexes those selected packets onto MPTS 340 in a multiplexing cycle without reserving any bit rate of the multiplexing cycle for traffic which does not exist at the moment.

Figure 5A:
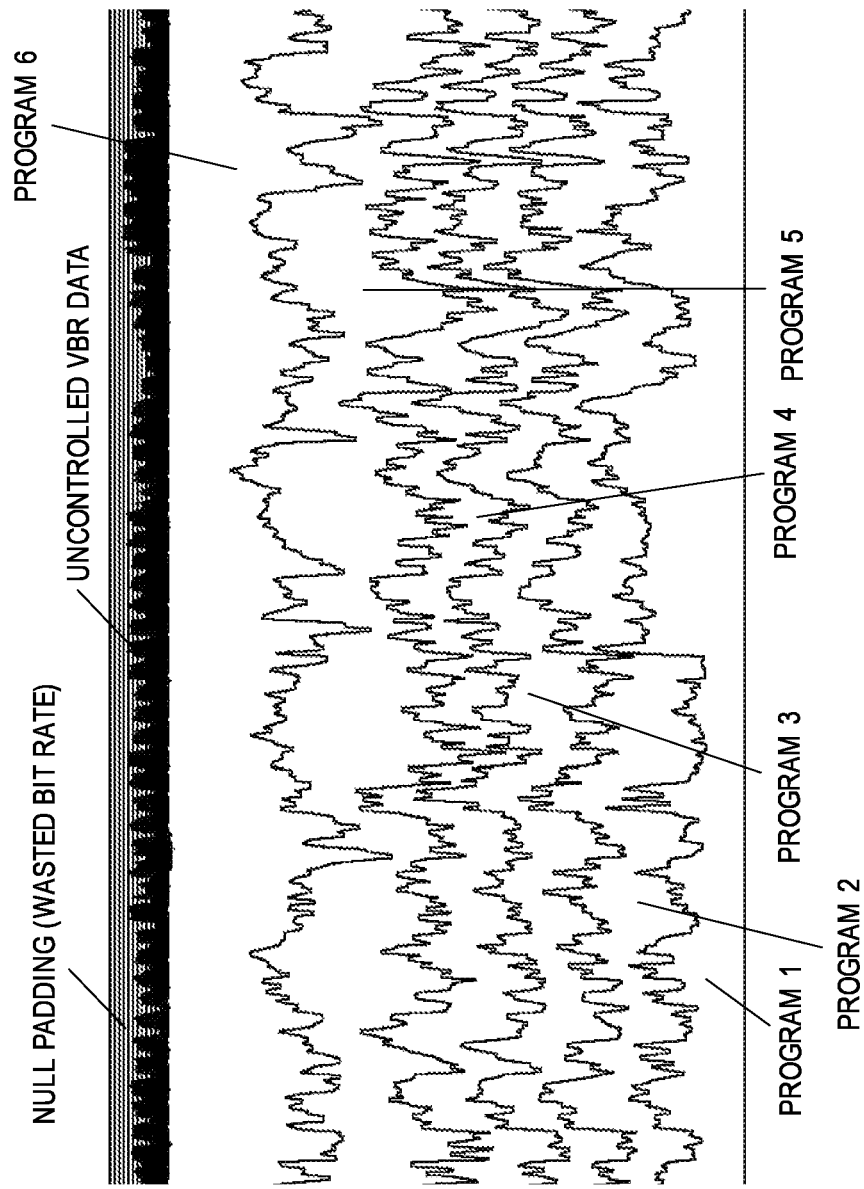
FIG. 5A is an illustration of the multiple program transport stream (MPTS) produced by the prior art over time.
Figure 5B:
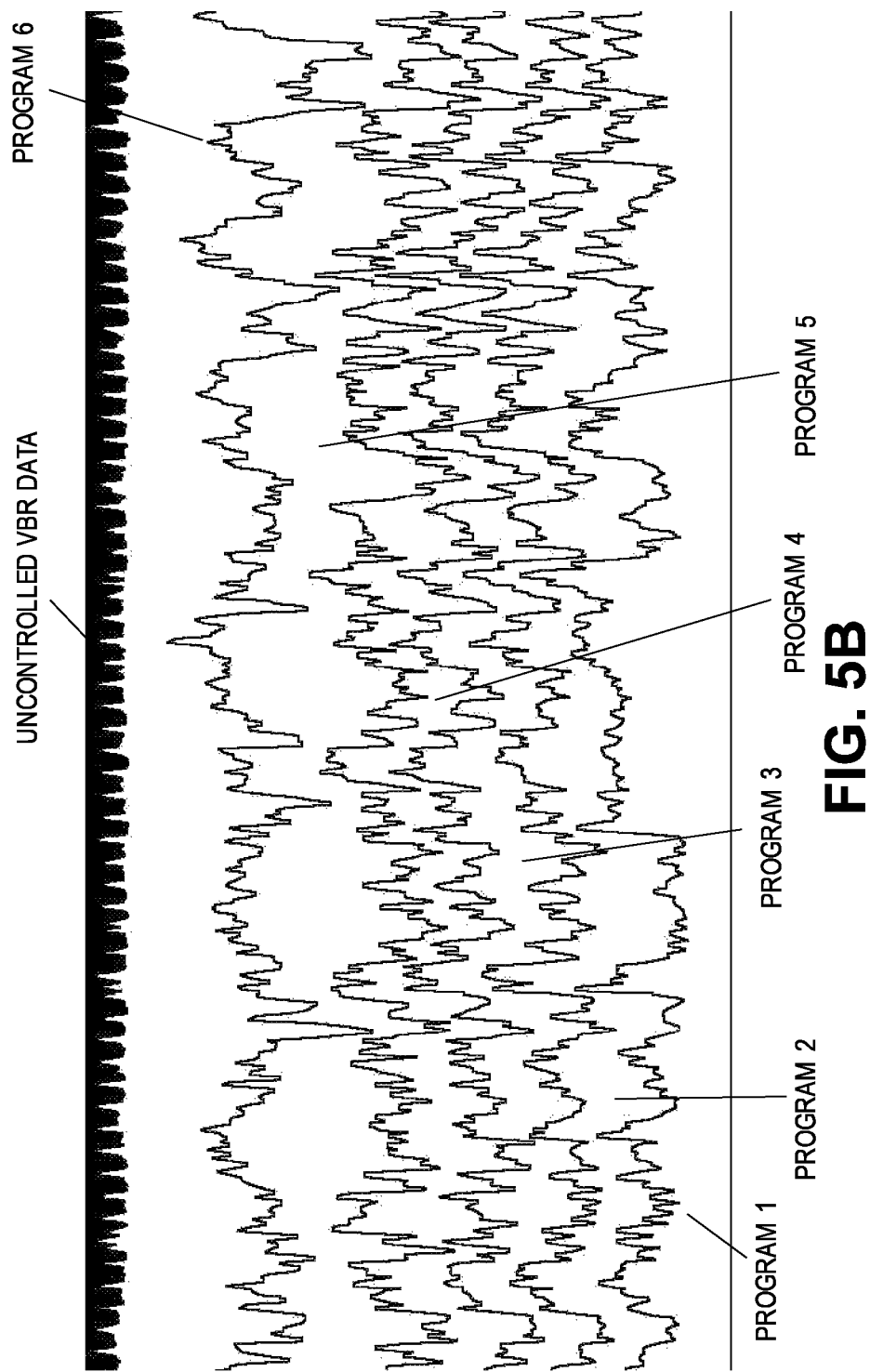
FIG. 5B is an illustration of the multiple program transport stream (MPTS) produced by a hybrid stat mux over time according to an embodiment of the invention.

To illustrate this point, consider FIGS. 5A and 5B. FIG. 5A is an illustration of the multiple program transport stream (MPTS) as produced by the prior art. Please note that the prior art reserves a portion of the bandwidth of the MPTS depicted in FIG. 5A for uncontrolled VBR data. If, as is common, the uncontrolled VBR data does not use all of the reserved bandwidth in the MPTS of the prior art, then this remaining bandwidth is wasted as null padding is added to this remainder of the reserved bandwidth, as shown in FIG. 5A.'

In contrast, FIG. 5B is an illustration of a multiple program transport stream (MPTS) as produced a hybrid stat mux over time according to an embodiment of the invention. As shown in FIG. 5B, all of the bit rates in each multiplexing cycle of hybrid stat mux 310 are utilized.

In step 220, multiplexer 314 determines, for each multiplexer cycle, delay information that identifies how many packets were delayed. Such delay information identifies, for each multiplexing cycle of hybrid stat mux 310, how close each program carried by SPTS 320, 322, and 324 is to breaking compliance with a video codec expressing the program. The purpose of performing step 220 is to inform hybrid stat mux 310 on how much each program carried by each SPTS input to hybrid stat mux 310 before the program ceases to be compliant with the video codec expressing the program; in this way, hybrid stat mux 310 is informed of how much each program may be delayed by hybrid stat mux 310.

In step 230, the size of the bit rate pool for a subsequent allocation cycle is adjusted. This adjustment is facilitated by information sent from multiplexer 314 to statmux controller 312. Such information may include the total amount of delayed packets from all streams 320, 322, 324, and/or 309 as well as the amount of unused space in MPTS 340. Based on this information, statmux controller 312 may adjust the size of the bit rate pool for a subsequent allocation cycle.

Statmux controller 312 and multiplexer 314 thus operate independently from one another. For example, while statmux controller 312 is responsible for activity supporting allocation cycles, multiplexer 314 is responsible for activity supporting multiplexing cycles.

The size of the bit rate pool for subsequent allocation cycles is adjusted to be inversely proportional to the number of packets stored in the in-memory containers which may store packets which are less likely of becoming non-compliant vis-à-vis a video codec the longer they are delayed (for example, the in-memory containers that store video packets).

In other words, the size of the bit rate pool for allocation cycles is reduced as the total number of packets temporarily stored in in-memory containers designated to store video data packets increases. On the other hand, the size of the bit rate pool for allocation cycles is increased as the total number of packets stored in in-memory containers designated to store video data packets decreases.

In an embodiment, VBV data may be included in messages sent from multiplexer 314 to statmux controller 312. In such an embodiment, a low VBV delay would result in a reduced pool value for a forthcoming allocation cycle. In this way, the size of the bit rate pool for a subsequent allocation cycle may be based upon a Virtual Buffering Verifier (VBV) imposed on each program carried by SPTSs 320, 322, and 324.

In a typical embodiment, the rate messages sent from mux controller 312 to each encoder will take effect in a subsequent allocation cycle in the near future (such as, for example, ~1.5-3 seconds), rather than immediately. As a result, if the bit rate pool associated with the allocation cycle is reduced now, then the decrease in the amount of delayed traffic will only be perceived at a later point in time.

In an embodiment, the size of the effective bit rate pool ($P_E$) associated with a particular allocation cycle is:

$$P_E = P_C + A_D + f()$$

where $P_C$ is the pool size configured in units of bits-per-second (bps), A represents the adjustment to $P_C$ so that on average, the desirable pool bitrate is $P_C + A$. The system makes a best effort to detect the correct value for A and $A_D$ represents that approximation of A. The function $f()$ produces smaller bitrate refinement that takes into account multiple variables, these may include the values produced by $f()$ in previous allocation cycles.

Embodiment may adjust $A_D$ over time higher or lower to approach the theoretical A. This may be accomplished with the help of messages that are sent to statmux controller 312 by multiplexer 314. Multiplexer 314 may calculate a running average of the unused bit rate in the MPTS in each multiplexing cycle. This value of the running average may be zero but not negative.

When statmux controller 312 receives a message from multiplexer 314, the message may contain one or more of the following types of information: (a) the amount of delayed bits currently in all the queues D in units of bits, and (b) the running average of the MPTS unused bitrate U in units of bps.

If the relationship between D and $P_C + A_D$ appears is such that D is deemed too high (the exact thresholds depend on the implementation), it means that $A_D$ has to be reduced. If D is too low, it means that $A_D$ has to be increased.

In addition, if U is non-zero (which probably means that D is zero or very small), then it means that $A_D$ can be increased by U, but it's more appropriate to do it in steps over time.

The evaluation of D may take into account previous bitrate allocations for which the traffic produced by the encoders may not have arrived at the multiplexer yet. The actual thresholds for changing $A_D$ and the details of the refinement function $f()$ should be calibrated for each implementation and depend on multiple factors, such as the duration of an allocation cycle, the duration of a multiplexing cycle, the frequency of multiplexer messages to the statmux controller 312, and the encoders' response time to bitrate allocation i.e. the time between a bitrate allocation and the time the respective traffic arrives at the multiplexer.

Maintaining the value of D at a small non-zero value is useful to create a nice "shock absorber." When the amount of uncontrolled traffic is low, some delayed data is ready to fill that space. When the amount of uncontrolled traffic rises, there is enough headroom to store some additional delayed traffic.

In step 240, MPTS 340 is delivered to one or more recipients, although in any reasonably embodiment the consumers of MPTS 340 will be a large number of computerized devices.

Embodiments may adjust PCR values when the PCR is on a packet that was delayed, and if necessary, add TS packets of type Adaptation-only to carry additional PCR to stay well within the standard PCR interval constraints.

Implementing Hardware

Figure 6:
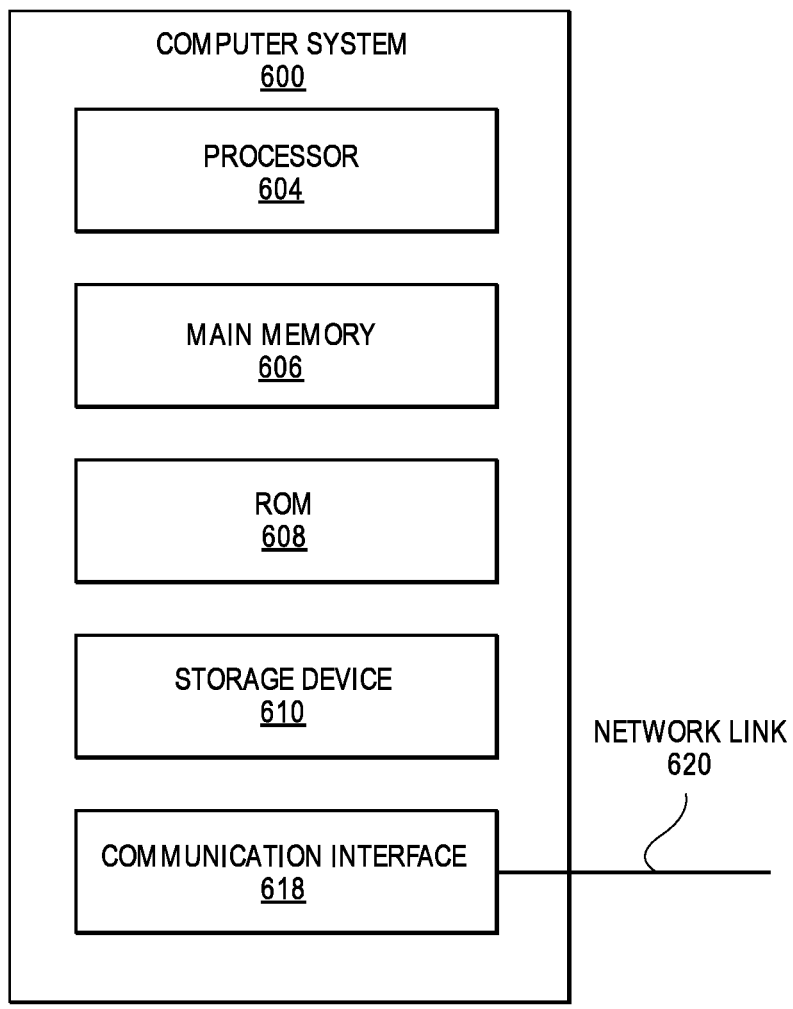
FIG. 6 is a block diagram that illustrates a computer system upon which an embodiment of the invention may be implemented.

In an embodiment, hybrid stat mux 310, or any component thereof, may be implemented on computer system 600 depicted in the block diagram of FIG. 6. In an embodiment, computer system 600 includes processor 604, main memory 606, ROM 608, storage device 610, and communication interface 618. Computer system 600 includes at least one processor 604 for processing information. Computer system 600 also includes a main memory 606, such as a random-access memory (RAM) or other dynamic storage device, for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device for storing static information and instructions for processor 604. A storage device 610, such as a magnetic disk or optical disk, is provided for storing information and instructions.

Embodiments of the invention are related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in storing instructions which may be provided to processor 604 for execution. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a network link 620 to computer system 600.

Communication interface 618 provides a two-way data communication coupling to a network link 620 that is connected to a local network. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through a local network to a host computer or to data equipment operated by an Internet Service Provider (ISP).

Computer system 600 can send messages and receive data, including program code, through the network(s), network link 620 and communication interface 618. For example, a server might transmit a requested code for an application program through the Internet, a local ISP, a local network, subsequently to communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium that stores one or more sequences of instructions for delivering a transport stream, which when executed by one or more processors, cause:
    over a plurality of multiplexing cycles, multiplexing a plurality of single program transport streams (SPTSs) onto a multiple program transport stream (MPTS), wherein multiplexing packets in said plurality of SPTSs onto said MPTS comprises, in each multiplexing cycle, determining whether any portion of the packets carried by said plurality of SPTSs may be delayed such that said portion is multiplexed onto said MPTS in a future multiplexing cycle;
    determining, for each multiplexing cycle in said plurality of multiplexing cycles, delay information that identifies how many packets were delayed;
    adjusting, based on the delay information for a prior multiplexing cycle in said plurality of multiplexing cycles, a size of said bit rate pool for a subsequent allocation cycle in a plurality of allocation cycles; and
    delivering said MPTS to one or more recipients.

2. The non-transitory computer-readable storage medium of claim 1, wherein multiplexing said plurality of SPTSs onto said MPTS comprises:
    maintaining, for each of said SPTSs, first and second in-memory containers, wherein said first in-memory containers store packets which are deemed to be less capable of being delayed without becoming non-compliant vis-à-vis a video codec associated therewith than packets stored by said second in-memory containers;

removing first packets from said first in-memory containers and multiplexing said first packets onto said MPTS in the particular multiplexing cycle at a first rate that is based on a schedule existing when said first packets were stored in said in-memory containers; and removing second packets from said second in-memory containers and multiplexing said second packets onto said MPTS in the particular multiplexing cycle at a second rate that is based, at least in part, upon how much bit rate remains in the particular multiplexing cycle after multiplexing said first packets onto the MPTS.

3. The non-transitory computer-readable storage medium of claim 2, wherein adjusting said size of said bit rate pool for the subsequent allocation cycle comprises:

reducing said size of said bit rate pool of the subsequent allocation cycle as a total number of packets stored in said second in-memory containers increases.

4. The non-transitory computer-readable storage medium of claim 2, wherein adjusting said size of said bit rate pool for the subsequent allocation cycle comprises:

increasing said size of said bit rate pool of the subsequent allocation cycle as a total number of packets stored in said second in-memory containers decreases.

5. The non-transitory computer-readable storage medium of claim 1, wherein adjusting said size of said bit rate pool for said subsequent allocation cycle is further based upon a Virtual Buffering Verifier (VBV) imposed on each program carried by the plurality of SPTSs.

6. The non-transitory computer-readable storage medium of claim 1, wherein said delay information identifies, for said each multiplexing cycle, how close each program carried by the plurality of SPTSs is to breaking compliance with a video codec expressing the program.

7. The non-transitory computer-readable storage medium of claim 2, wherein removing second packets from said second in-memory containers and multiplexing said second packets onto the MPTS comprises increasing a portion of bit rates distributed during one or more multiplexing cycles to a particular program carried by the plurality of SPTSs in response to determining that a Virtual Buffering Verifier (VBV) of said particular program is below a particular threshold.

8. The non-transitory computer-readable storage medium of claim 2, wherein said second rate is further based upon an amount of pending traffic in each program carried by the plurality of SPTSs.

9. The non-transitory computer-readable storage medium of claim 1, wherein multiplexing said SPTSs onto said MPTS is performed without reserving any bit rate of the multiplexing cycle for traffic which does not exist at the moment.

10. An apparatus for delivering a transport stream, comprising:

one or more processors; and one or more non-transitory computer-readable storage mediums storing one or more sequences of instructions, which when executed, cause:

over a plurality of multiplexing cycles, multiplexing a plurality of single program transport streams (SPTSs) onto a multiple program transport stream (MPTS), wherein multiplexing packets in said plurality of SPTSs onto said MPTS comprises, in each multiplexing cycle, determining whether any portion of the packets carried by said plurality of SPTSs may be delayed such that said portion is multiplexed onto said MPTS in a future multiplexing cycle;

determining, for each multiplexing cycle in said plurality of multiplexing cycles, delay information that identifies how many packets were delayed;

adjusting, based on the delay information for a prior multiplexing cycle in said plurality of multiplexing cycles, a size of said bit rate pool for a subsequent allocation cycle in a plurality of allocation cycles; and delivering said MPTS to one or more recipients.

11. The apparatus of claim 10, wherein multiplexing said plurality of SPTSs onto said MPTS comprises:

maintaining, for each of said SPTSs, first and second in-memory containers, wherein said first in-memory containers store packets which are deemed to be less capable of being delayed without becoming non-compliant vis-à-vis a video codec associated therewith than packets stored by said second in-memory containers;

removing first packets from said first in-memory containers and multiplexing said first packets onto said MPTS in the particular multiplexing cycle at a first rate that is based on a schedule existing when said first packets were stored in said in-memory containers; and removing second packets from said second in-memory containers and multiplexing said second packets onto said MPTS in the particular multiplexing cycle at a second rate that is based, at least in part, upon how much bit rate remains in the particular multiplexing cycle after multiplexing said first packets onto the MPTS.

12. The apparatus of claim 11, wherein adjusting said size of said bit rate pool for the subsequent allocation cycle comprises:

reducing said size of said bit rate pool of the subsequent allocation cycle as a total number of packets stored in said second in-memory containers increases.

13. The apparatus of claim 11, wherein adjusting said size of said bit rate pool for the subsequent allocation cycle comprises:

increasing said size of said bit rate pool of the subsequent allocation cycle as a total number of packets stored in said second in-memory containers decreases.

14. The apparatus of claim 10, wherein adjusting said size of said bit rate pool for said subsequent allocation cycle is further based upon a Virtual Buffering Verifier (VBV) imposed on each program carried by the plurality of SPTSs.

15. The apparatus of claim 10, wherein said delay information identifies, for said each multiplexing cycle, how close each program carried by the plurality of SPTSs is to breaking compliance with a video codec expressing the program.

16. The apparatus of claim 11, wherein removing second packets from said second in-memory containers and multiplexing said second packets onto the MPTS comprises increasing a portion of bit rates distributed during one or more multiplexing cycles to a particular program carried by the plurality of SPTSs in response to determining that a Virtual Buffering Verifier (VBV) of said particular program is below a particular threshold.

17. The apparatus of claim 11, wherein said second rate is further based upon an amount of pending traffic in each program carried by the plurality of SPTSs.

18. The apparatus of claim 10, wherein multiplexing said SPTSs onto said MPTS is performed without reserving any bit rate of the multiplexing cycle for traffic which does not exist at the moment.

19. A method for delivering a transport stream, comprising:
- over a plurality of multiplexing cycles, multiplexing a plurality of single program transport streams (SPTSs) onto a multiple program transport stream (MPTS), wherein multiplexing packets in said plurality of SPTSs onto said MPTS comprises, in each multiplexing cycle, determining whether any portion of the packets carried by said plurality of SPTSs may be delayed such that said portion is multiplexed onto said MPTS in a future multiplexing cycle;
- determining, for each multiplexing cycle in said plurality of multiplexing cycles, delay information that identifies how many packets were delayed;
- adjusting, based on the delay information for a prior multiplexing cycle in said plurality of multiplexing cycles, a size of said bit rate pool for a subsequent allocation cycle in a plurality of allocation cycles; and
- delivering said MPTS to one or more recipients.

20. The method of claim 19, wherein multiplexing said plurality of SPTSs onto said MPTS comprises:
- maintaining, for each of said SPTSs, first and second in-memory containers, wherein said first in-memory containers store packets which are deemed to be less capable of being delayed without becoming non-compliant vis-à-vis a video codec associated therewith than packets stored by said second in-memory containers;
- removing first packets from said first in-memory containers and multiplexing said first packets onto said MPTS in the particular multiplexing cycle at a first rate that is based on a schedule existing when said first packets were stored in said in-memory containers; and
- removing second packets from said second in-memory containers and multiplexing said second packets onto said MPTS in the particular multiplexing cycle at a second rate that is based, at least in part, upon how much bit rate remains in the particular multiplexing cycle after multiplexing said first packets onto the MPTS.

* * * * *